United States Patent [19]

Thacker

[11] Patent Number: 6,011,548

[45] Date of Patent: Jan. 4, 2000

[54] SYSTEM FOR INTEGRATING SATELLITE BOARDBAND DATA DISTRIBUTED OVER A CABLE TV NETWORK WITH LEGACY CORPORATE LOCAL AREA NETWORKS

[75] Inventor: John C. Thacker, Los Altos, Calif.

[73] Assignee: CyberStar, L.P., Palo Alto, Calif.

[21] Appl. No.: 09/148,569

[22] Filed: Sep. 4, 1998

[51] Int. Cl.[7] .............................. H04N 7/00; H04N 7/14; H04H 1/100
[52] U.S. Cl. .............................. 345/327; 348/12; 348/13; 348/10; 455/3.2; 455/3.1; 455/5.1
[58] Field of Search ........................ 395/200.47; 345/327; 348/12, 13, 6, 10; 455/3.2, 3.1, 5.1, 6.1, 6.2, 6.3; H04N 7/10, 7/14; H04H 1/100

[56] References Cited

U.S. PATENT DOCUMENTS

| | | | |
|---|---|---|---|
| 5,019,910 | 5/1991 | Filmer | 455/185 |
| 5,130,803 | 7/1992 | Kurita et al. | 455/182 |
| 5,499,046 | 3/1996 | Schiller et al. | 348/12 |
| 5,594,490 | 1/1997 | Dawson et al. | 348/12 |
| 5,687,194 | 11/1997 | Paneth et al. | 455/33.1 |
| 5,822,324 | 10/1998 | Kostresti et al. | 370/487 |
| 5,870,134 | 2/1999 | Laubach et al. | 348/12 |
| 5,893,024 | 4/1999 | Sanders et al. | 348/12 |
| 5,923,379 | 7/1999 | Patterson | 348/565 |

*Primary Examiner*—Nathan J. Flynn
*Assistant Examiner*—Vivek Srivastava
*Attorney, Agent, or Firm*—Kenneth W. Float

[57] ABSTRACT

A broadband multimedia data distribution system that integrates satellite broadband data derived from a satellite feed that is distributed over a cable TV network with a legacy corporate local area network. The system provides a broadband network overlay with satellite data delivery that integrates with currently available cable television transmission media. The system thus integrates broadband multimedia data distribution, cable TV network distribution, and the legacy network to expand corporate information services. The system thus expands existing network capabilities and avoids replacement or upgrade costs.

9 Claims, 2 Drawing Sheets

SYSTEM FOR INTEGRATING SATELLITE BOARDBAND DATA DISTRIBUTED OVER A CABLE TV NETWORK WITH LEGACY CORPORATE LOCAL AREA NETWORKS

BACKGROUND

The present invention relates generally to broadband multimedia data distribution systems, and more particularly, to apparatus for integrating satellite broadband data distributed over a cable TV network with legacy corporate local area networks.

Legacy corporate local area networks (LANs) can become congested under user demand for broadband multimedia data and other data services. These legacy networks are costly to replace or upgrade to meet the increasing demand for multimedia data. It would be desirable to have the ability to expand existing legacy network capabilities and avoid replacement or upgrade costs.

Currently available technology relating to the present invention includes a Multimedia Cable Networking Standards (MCNS) compliant "data over cable TV" architecture. By way of background, the Institute of Electronic and Electrical Engineering's (IEEE) 802.14 Cable TV Media Access Control and Physical Protocol Working Group was formed in 1994 to develop international standards for data communications over cable. The goal was to submit a cable modem Media Access Control and Physical Protocol standard to the IEEE in December 1995, but the delivery date slipped to late 1997.

Because of the delay in finalizing the IEEE 802.14 standard, certain cable operators, operating under a limited partnership dubbed Multimedia Cable Network System Partners Ltd. (MCNS), proceeded to research and publish their own set of interface specifications for high-speed cable data services. MCNS released its Data Over Cable System Interface Specification (DOCSIS) for cable modem products to vendors in March 1997. Many vendors have announced plans to build products based on the MCNS DOCSIS standard.

The differing cable modem specifications advocated by IEEE 802.14 and MCNS reflect the priorities of each organization. The 802.14 group focused on creating a future-proof standard based on industrial-strength technology. The members of MCNS, on the other hand, were concerned with mnimizing product costs and time to market. To achieve its objectives, MCNS sought to minimize technical complexity and develop a technology solution that was adequate for its members' needs.

At the physical layer, which defines modulation formats for digital signals, the IEEE and MCNS specifications are similar. The 802.14 specification supports the International Telecommunications Union's (ITU) J.83 Annex A, B and C standards for 64/256 QAM modulation, providing a maximum 36 Mbps of downstream throughput per 6 MHz television channel. The Annex A implementation of 64/256 QAM is the European DVB/DAVIC standard, Annex B is the North American standard supported by MCNS, while Annex C is the Japanese specification. The proposed 802.14 upstream modulation standard is based on QPSK (quadrature phase shift keying) and 16QAM, virtually the same as MCNS.

As for media access control, which sets the rules for network access by users, 802.14 specified Asynchronous Transfer Mode (ATM) as its default solution from the headend to the cable modem. MCNS uses a scheme based on variable-length packets that favors delivery of Internet Protocol (IP) data. Although the MCNS media access control is based on packets and the IEEE specifies fixed ATM cells, both cable modem solutions specify a 10 Base-T Ethernet connection from the cable modem to the PC.

It would be desirable to have a multimedia data distribution system and method that overcomes limitations of the Multimedia Cable Networking Standards architecture. Accordingly, it is an objective of the present invention to provide for broadband multimedia data distribution system apparatus for integrating satellite broadband data distributed over a cable TV network with legacy corporate local area networks.

SUMMARY OF THE INVENTION

To meet the above and other objectives, the present invention provides for a broadband multimedia data distribution system that integrates satellite broadband data distributed over a cable TV network with a legacy corporate local area network (LAN). The present invention provides a broadband network overlay with satellite data delivery that integrates with currently available cable television transmission media The present invention thus integrates broadband multimedia data distribution, cable TV network distribution, and the legacy network to expand corporate information services. The present invention thus expands existing network capabilities and avoids replacement or upgrade costs.

More particularly, the broadband multimedia data distribution system comprises a satellite receiver that receives a satellite feed whose output is coupled to an enterprise server for distributing broadband data content derived from the satellite feed. Network switching equipment is coupled to the enterprise server whose output is coupled by way of a router to a local area network. Headend equipment is coupled to the network switching equipment that comprises a cable modem terminating system, one or more upconverters, a combiner, and a diplexer. A bidirectional cable transmission system interconnects the diplex filter and a cable modem, and a personal computer is coupled to the cable modem.

Client and server software provided on the enterprise server and on the personal computer provides for access to broadband content, broadband network services provided by the satellite receiver and enterprise server, and network services provided by the local area network.

Unique aspects of the present invention include the provision for satellite broadband data delivery and the interconnection of a "data over cable TV" network with an existing corporate LAN using router (layer 3) networking equipment and server software and client/server software used to integrate the services of the broadband receiver and server and the existing corporate LAN.

BRIEF DESCRIPTION OF THE DRAWINGS

The various features and advantages of the present invention may be more readily understood with reference to the following detailed description taken in conjunction with the accompanying drawings, wherein like reference numerals represent like structural elements, and in which.

DETAILED DESCRIPTION

Figure 1:
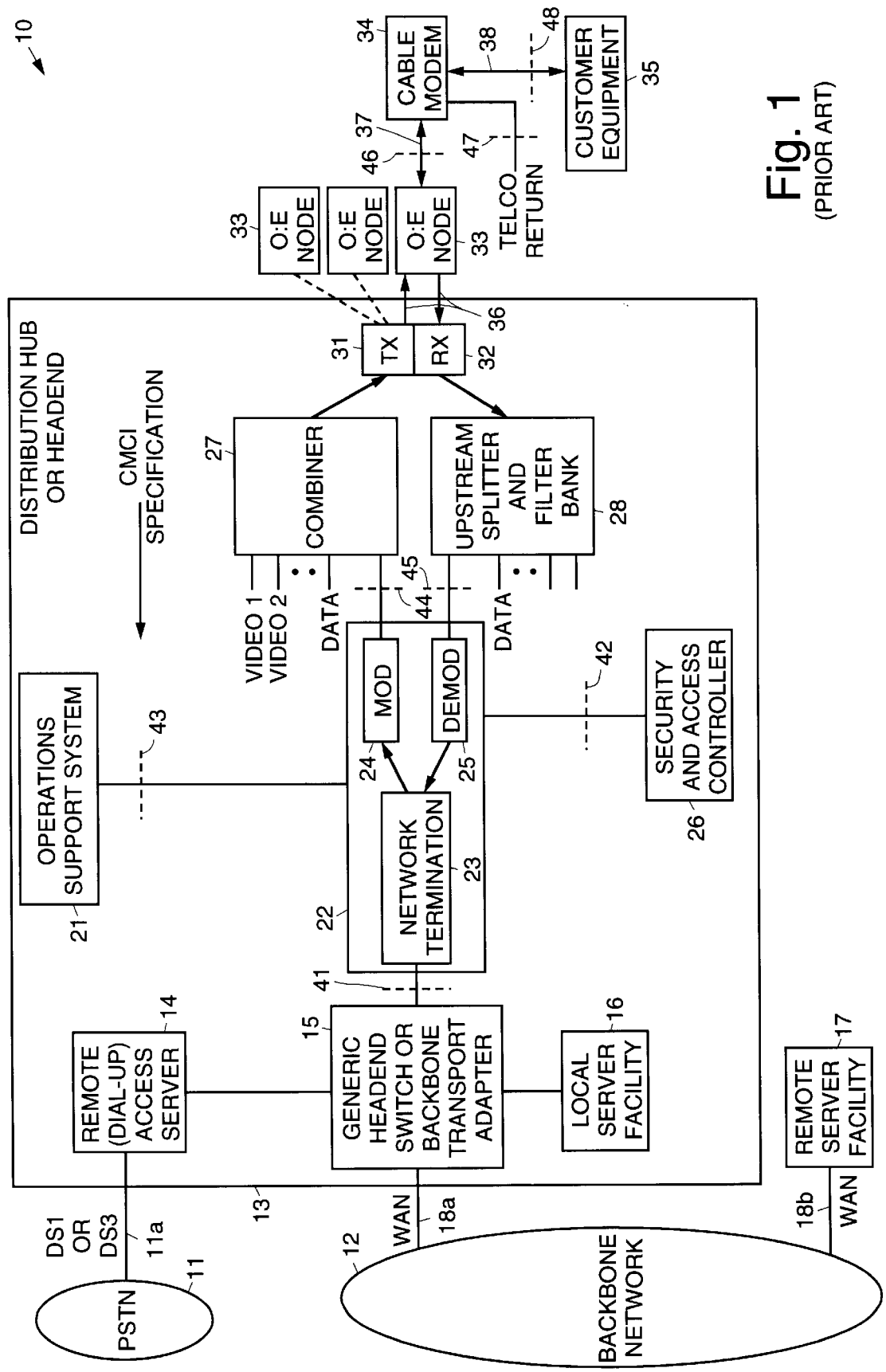
FIG. 1 is a block diagram that illustrates the architecture of a Multimedia Cable Networking Standards system.

Referring to the drawing figures, FIG. 1 is a block diagram that illustrates the architecture of a Multimedia Cable Networking Standards (MCNS) system 10. As is shown in FIG. 1, the MCNS system 10 includes a public service telephone network (PSTN) 11 that is connected to a distribution hub 13 or headend equipment 13 by way of a local exchange carrier digital subscriber service 11a (DS 1 at 1.544 Mbps or DS3at 44.736 Mbps). The public service telephone network 11 is connected to a remote access server 14 or dial-up server 14 that is part of the distribution hub 13.

The distribution hub 13 also includes a headend switch 15 or backbone transport adapter 15 that is coupled to the remote access server 14. The headend switch 15 or backbone transport adapter 15 is coupled to a backbone network 12 by way of a wide area network 18a. The headend switch 15 or backbone transport adapter 15 is also coupled to a local sever facility 16. A remote sever facility 17 is also coupled to the backbone network 12 by way of a wide area network 18b.

The headend switch 15 or backbone transport adapter 15 is connected by way of a cable modem termination system network side interface 41 to a network termination 23 of a cable modem termination system 22. The network termination 23 is coupled to a modulator (MOD) 24 and to a demodulator (DEMOD) 25. The output of the modulator 24 is coupled by way of a cable modem termination system downstream RF side interface 44 to a data input of a combiner 27. The combiner 27 also receives video inputs for distribution. The combiner 27 is coupled to a transmitter (TX) 31 which communicates over a fiber link 36 to a plurality of O:E nodes (optical/electrical node) 33.

Each node 33 is coupled, through a coaxial cable plant, by way of a cable modem to RF interface 46 to an input of a cable modem 34. The cable plant may have a spectrum of from about 50 MHz to about 750 MHz. The cable modem 34 is coupled by way of a cable modem to customer equipment interface 48 to customer equipment 35, such as a personal computer 35. A telephone company return (Telco return) is provided from the cable modem 34 to the telephone company by way of a cable modem to telephone company interface 47.

Each node 33 is also coupled by way of a fiber link 36 to a receiver (RX) 32. The receiver 3 is coupled to an upstream splitter and filter bank 28. Data outputs of the upstream splitter and filter bank 28 are coupled by way of a cable modem termination system upstream RF side interface 45 to the demodulator (DEMOD) 25. The demodulator (DEMOD) 25 is coupled to the network termination 23.

An operations support system 21 is coupled by way of a data over cable system OSS interface 43 to the cable modem termination system 22. The data over cable system OSS interface 43 meets a CMCI (cable modem computer interface) specification. A security and access controller 26 is coupled to the cable modem termination system 22 by way of a security management interface 42.

Figure 2:
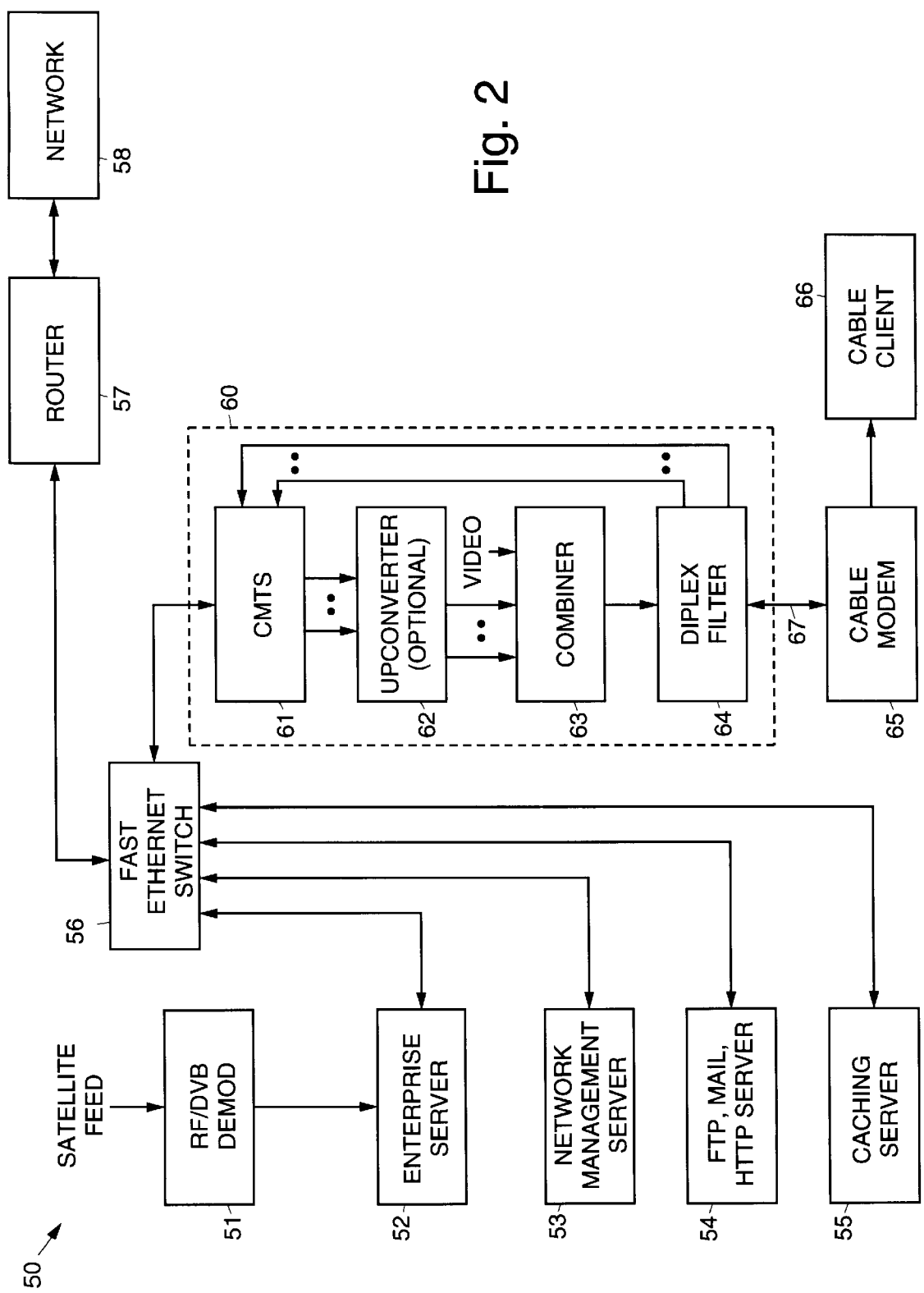
FIG. 2 is a block diagram that illustrates a broadband multimedia data distribution system in accordance with the principles of the present invention.

Referring now to FIG. 2, it is a block diagram that illustrates a broadband multimedia data distribution system 50 in accordance with the principles of the present invention. The broadband multimedia data distribution system 50 requires installation of cable media, RF headend (primary sending and receiving transmission equipment), cable modem terminating equipment, and cable modems, similar to equipment that is used in the MCNS system 10.

The broadband multimedia data distribution system 50 comprises a satellite receiver 51 for receiving a satellite feed. The satellite receiver 51 includes a receive antenna, a low noise block down converter and RF and digital video broadcast (DVB) demodulators. The satellite receiver 51 is coupled to an enterprise server 52 that provides for distribution of broadband data content. The satellite receiver 51 and enterprise server 52 form a broadband subnetwork 50a of the system 10. The enterprise server 52 is coupled to a first input of a network switching equipment 56, such as a fast Ethernet switch 56, that is used to interconnect the various network elements of the system 10.

A plurality of additional network servers may be coupled to the fast Ethernet switch 56 that provide for any number of standard services. For example, FIG. 1 illustrates the use of a network management server 53 that is coupled to a second input of the fast Ethernet switch 56. Also shown is an ftp, mail and http server 54 that is coupled to a third input of the fast Ethernet switch 56. A caching server 55 may also be coupled to a fourth input of the fast Ethernet switch 56.

The fast Ethernet switch 56 is coupled by way of a router 57 (layer 3 data distribution equipment) to an existing (legacy) local area network (LAN) 58. The fast Ethernet switch 56 is also coupled to headend equipment 60. The headend equipment 60 comprises a cable modem terminating system (CMTS) 61, appropriate upconverters 62, a combiner 63, and a diplexer 64.

The cable modem terminating system 61 is capable of providing one or more 6 Mz data channels over the same cable plant. Each 6 MHz data channel provides a data rate of approximately 30 Mbps depending on the modulation that is used (64/256 QAM). Given that the cable plant has a spectrum of from 50 MHz to 750 MHz, the present system provides for transmission of a large amount of broadband data The cable modem terminating system 61 is coupled to one or more upconverters (optional), one for each 6 MHz data channel. Outputs of the upconverters 62 are coupled to inputs of a combiner 63. The output of the combiner 63 is coupled to the diplexer 64, or diplex filter 64. The diplex filter 64 is coupled by way of a cable system 67 to a cable modem 65. The cable system 67 is capable of providing two-way transmission. Each cable modem is capable of transmitting data originating at the user computer to the head end, on frequencies consistent with a two-way cable system. The diplexer 64 or diplex filter 64 is also coupled to the cable modem terminating system 61, terminating one or more cable modem transmission channels. The cable modem 65 is coupled to a personal computer 66 of a cable client.

To integrate the various components of the system 10, client and server software is provided on the various servers 52, 53, 54, 55 and on the personal computer 66 of the cable client to access the broadband content, network services provided on the broadband subnetwork 51a, and network services provided by the existing local area network (LAN) 58.

The enterprise server acts as the primary manager of the services provided over the network. Enterprise channel/server software acts as a proxy for the servers 53, 54, 55 directly attached to the network and for services existing on the local area network (LAN) 58. The enterprise client/server thus directs requests for services which it cannot provide otherwise. The enterprise client/server software provides the only means of accessing broadband information transferred via satellite. The servers 53, 54, 55 are used for illustrative purposes only to demonstrate the alternatives available in providing integrated broadband services. The enterprise client/server software is readily constructed using http server, proxy server, and browser technologies.

Thus, apparatus for integrating satellite broadband data distributed over a cable TV network with legacy corporate local area networks has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A broadband multimedia data distribution system comprising:
   a satellite receiver for receiving a satellite feed and that includes RF and digital video broadcast demodulators;
   an enterprise server coupled to the satellite receiver for distributing broadband data content derived from the satellite feed and that forms a broadband subnetwork 51a;
   network switching equipment coupled to the enterprise server;
   a router interconnecting the network switching equipment to a local area network;
   headend equipment coupled to the network switching equipment that comprises a cable modem terminating system, one or more upconverters coupled to the cable modem terminating system, a combiner coupled to the one or more upconverters, and a diplexer coupled to the combiner;
   a bidirectional cable transmission system interconnected between the diplex filter and a cable modem;
   a personal computer coupled to the cable modem; and
   client and server software disposed on the enterprise server and personal computer that provide for access to broadband content, network services provided on the broadband subnetwork, and network services provided by the local area network.

2. The system recited in claim 1 wherein the network switching equipment comprises a fast Ethernet switch.

3. The system 5 recited in claim 2 further comprising one or more additional network servers coupled to the network switching equipment.

4. The system recited in claim 1 wherein the one or more additional network servers comprises a network management server.

5. The system recited in claim 1 wherein the one or more additional network servers comprises an ftp, mail and http server.

6. The system recited in claim 1 wherein the one or more additional network servers comprises a caching server.

7. The system recited in claim 1 wherein the diplexer is coupled to the cable modem terminating system.

8. The system 5 recited in claim 1 which provides one or more downstream data channels and one or more upstream return data channels over the cable transmission system.

9. The system recited in claim 8 wherein the downstream data channels are approximately 6 MHz data channels.

* * * * *